US012586343B2

(12) United States Patent
Yu et al.

(10) Patent No.: US 12,586,343 B2
(45) Date of Patent: Mar. 24, 2026

(54) ELECTRONIC DEVICE AND METHOD WITH IMAGE PROCESSING THROUGH CANONICAL SPACE

(71) Applicants: SAMSUNG ELECTRONICS CO., LTD., Suwon-si (KR); UIF (University Industry Foundation), Yonsei University, Seoul (KR)

(72) Inventors: Junsang Yu, Suwon-si (KR); Dong Young Kim, Seoul (KR); Seon Joo Kim, Seoul (KR); Kinam Kwon, Suwon-si (KR)

(73) Assignees: Samsung Electronics Co., Ltd., Suwon-si (KR); UIF (University Industry Foundation), Yonsei University, Seoul (KR)

( * ) Notice: Subject to any disclaimer, the term of this patent is extended or adjusted under 35 U.S.C. 154(b) by 319 days.

(21) Appl. No.: 18/324,635

(22) Filed: May 26, 2023

(65) Prior Publication Data

US 2024/0185557 A1     Jun. 6, 2024

(30) Foreign Application Priority Data

Dec. 2, 2022     (KR) ........................ 10-2022-0166953

(51) Int. Cl.
G06V 10/56          (2022.01)
G06T 5/20            (2006.01)
G06V 10/60          (2022.01)

(52) U.S. Cl.
CPC ................ G06V 10/56 (2022.01); G06T 5/20 (2013.01); G06V 10/60 (2022.01); (Continued)

(58) Field of Classification Search
CPC .......... G06V 10/56; G06V 10/60; G06T 5/20; G06T 2207/10024; G06T 2207/20081; (Continued)

(56) References Cited

U.S. PATENT DOCUMENTS 10,489,936 B1 * 11/2019 Zafar ................... G06N 3/0495
10,496,903 B2 * 12/2019 Danielsson .......... G06N 3/0464
(Continued)

FOREIGN PATENT DOCUMENTS

CN          102547301 A     7/2012
CN          113888432 A     1/2022
(Continued)

OTHER PUBLICATIONS

M. Afifi, A. Abdelhamed, A. Abuolaim, A. Punnappurath and M. S. Brown, "CIE XYZ Net: Unprocessing Images for Low-Level Computer Vision Tasks," in IEEE Transactions on Pattern Analysis and Machine Intelligence, vol. 44, No. 9, pp. 4688-4700, Sep. 1, 2022, doi: 10.1109/TPAMI.2021.307058 (Year: 2022).*
(Continued)

*Primary Examiner* — Andrae S Allison
(74) *Attorney, Agent, or Firm* — NSIP Law

(57)          ABSTRACT

Provided are an electronic devices and methods for processing an image through a canonical space, the method including receiving training images of a scene obtained from a first sensor, generating first conversion images by converting the training images into images corresponding to a scene obtained through a second sensor, generating second conversion images by converting a color value of the training images and a color value of the first conversion images, and training a canonical image generative model configured to convert the training images, the first conversion images, and (Continued)

the second conversion images into canonical space images of a canonical color space and a canonical illumination space.

20 Claims, 15 Drawing Sheets

(52) U.S. Cl.
CPC ............... *G06T 2207/10024* (2013.01); *G06T 2207/20081* (2013.01); *G06T 2207/20084* (2013.01)

(58) Field of Classification Search
CPC ......... G06T 2207/20084; G06T 11/001; G06T 5/40; H04N 23/85; H04N 23/88; G06N 3/0455; G06N 3/0464
See application file for complete search history.

(56) References Cited

U.S. PATENT DOCUMENTS

| | | | | |
|---|---|---|---|---|
| 12,198,398 | B2 * | 1/2025 | Assouline | G06T 7/73 |
| 2018/0096232 | A1 * | 4/2018 | Danielsson | G06V 10/82 |
| 2019/0295223 | A1 * | 9/2019 | Shen | G06N 3/045 |
| 2022/0164601 | A1 * | 5/2022 | Lo | G06N 20/00 |
| 2022/0327629 | A1 * | 10/2022 | Chan | G07C 5/0808 |
| 2022/0364166 | A1 * | 11/2022 | Lee | G16B 35/10 |
| 2023/0196712 | A1 * | 6/2023 | Assouline | G06T 11/00 382/107 |
| 2024/0419382 | A1 * | 12/2024 | Dekel | G06V 20/70 |
| 2025/0148575 | A1 * | 5/2025 | Kim | G06N 3/045 |

FOREIGN PATENT DOCUMENTS

| | | |
|---|---|---|
| CN | 114730456 A | 7/2022 |
| KR | 10-2020-0145670 A | 12/2020 |
| KR | 10-2021-0074748 A | 6/2021 |

OTHER PUBLICATIONS

Afifi, Mahmoud, and Michael S. Brown. "Sensor-independent illumination estimation for DNN models." arXiv preprint arXiv: 1912. 06888 (2019). (Year: 2019).*

Tumanyan et al, Splicing ViT Features for Semantic Appearance Transfer, https://arxiv.org/abs/2201.00424, Jan. 2, 2022 (Year: 2022).*

Das et al, Generative Models for Multi-Illumination Color Constancy, 2021 IEEE/CVF International Conference on Computer Vision Workshop (ICCVW) (Year: 2022).*

Nam, Seonghyeon, et al. "Learning sRGB-to-Raw-RGB De-rendering with Content-Aware Metadata." *Proceedings of the IEEE/ CVF Conference on Computer Vision and Pattern Recognition.* 2022.

* cited by examiner

1400

1

ELECTRONIC DEVICE AND METHOD WITH IMAGE PROCESSING THROUGH CANONICAL SPACE

CROSS-REFERENCE TO RELATED APPLICATION

This application claims the benefit of Korean Patent Application No. 10-2022-0166953 filed on Dec. 2, 2022, in the Korean Intellectual Property Office, the entire disclosure of which is incorporated herein by reference for all purposes.

BACKGROUND

1. Field

The following description relates to an electronic device for processing an image through a canonical space and a controlling method of the electronic device.

2. Description of Related Art

Interest in image processing technology based on artificial intelligence (AI) models is on the rise due to growing demand for AI technology and various methods of applying the AI technology. Studies are being conducted to improve the performance of image signal processor (ISP) networks that process training images for various purposes.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a processor-implemented method of training an image processing model, the method including receiving training images of a scene obtained from a first sensor, generating first conversion images by converting the training images into images corresponding to a scene obtained through a second sensor, generating second conversion images by converting a color value of the training images and a color value of the first conversion images, and training a canonical image generative model configured to convert the training images, the first conversion images, and the second conversion images into canonical space images of a canonical color space and a canonical illumination space.

The generating of the first conversion images may include generating the first conversion images by maintaining the color value of the training images and converting a pixel value of the training images into a pixel value of the second sensor.

The generating of the first conversion images may include generating the first conversion images by maintaining a pixel value of the training images and converting the color value of the training images into a color value of the second sensor.

The generating of the second conversion images may include generating the second conversion images by changing a red (R) channel value of the first conversion images and a blue (B) channel value of the first conversion images and applying a uniformly-distributed single illumination to the first conversion images with the changed R channel value and the changed B channel value.

The canonical image generative model may be based on a convolutional neural network model.

The training for converting into the canonical space images may include training the canonical image generative model to minimize a loss function determined based on a difference between a reference image and each of outputs obtained by inputting the training images, the first conversion images, and the second conversion images to the canonical image generative model.

The reference image may be a standard Red Green Blue (SRGB) image, and the reference image may be obtained by the first sensor.

The loss function applied to the training images, the first conversion images, and the second conversion images may be the same.

The training for converting into the canonical space images may include performing training based on a CIE XYZ coordinate value.

The training for converting into the canonical space images may include training the canonical image generative model to minimize a loss function determined based on a difference between the training images and a reference image.

The method may include receiving the canonical space images, augmenting an image effect of the canonical space images, and training an image effect augmentation model configured to output target images based on the augmented canonical space images.

The target images may be standard Red Green Blue (sRGB) images.

The target images may be standard Red Green Blue (SRGB) images of a sensor different from the first sensor, images with different sensitivity from the training images, or images to which a filter different from a filter of the training images may be applied.

The method may include training the image processing model through a conversion matrix or a convolutional neural network encoder and a convolutional neural network decoder.

In another general aspect, there is provided a processor-implemented method of processing an image, the method including receiving an input image, inputting the input image into a canonical image generative model to obtain a canonical image of a canonical color space and a canonical illumination space, and obtaining a result image, to which image effect augmentation processing is applied, by using an image effect augmentation model configured to take the canonical image as an input.

The result image may be a standard Red Green Blue (sRGB) image.

In another general aspect, there is provided an electronic device including a first sensor configured to capture training images of a scene, a processor configured to receive the training images, generate first conversion images by converting the training images into images corresponding to the scene obtained through a second sensor, generate second conversion images by converting a color value of the training images and a color value of the first conversion images, and train a canonical image generative model configured to convert the training images, the first conversion images, and the second conversion images into canonical space images of a canonical color space and a canonical illumination space.

The processor may be configured to receive the canonical space images, augment an image effect of the canonical space images, and train an image effect augmentation model configured to output target images based on the augmented canonical space images.

In another general aspect, there is provided an electronic device including a memory configured to store instructions, and a processor configured to execute the instructions stored in the memory to configure the processor to receive an input image, input the input image into a canonical image generative model to obtain a canonical image of a canonical color space and a canonical illuminance space, and obtain a result image, to which image effect augmentation processing may be applied, by using an image effect augmentation model configured to take the canonical image as an input.

Other features and aspects will be apparent from the following detailed description, the drawings, and the claims.

Figure 1:
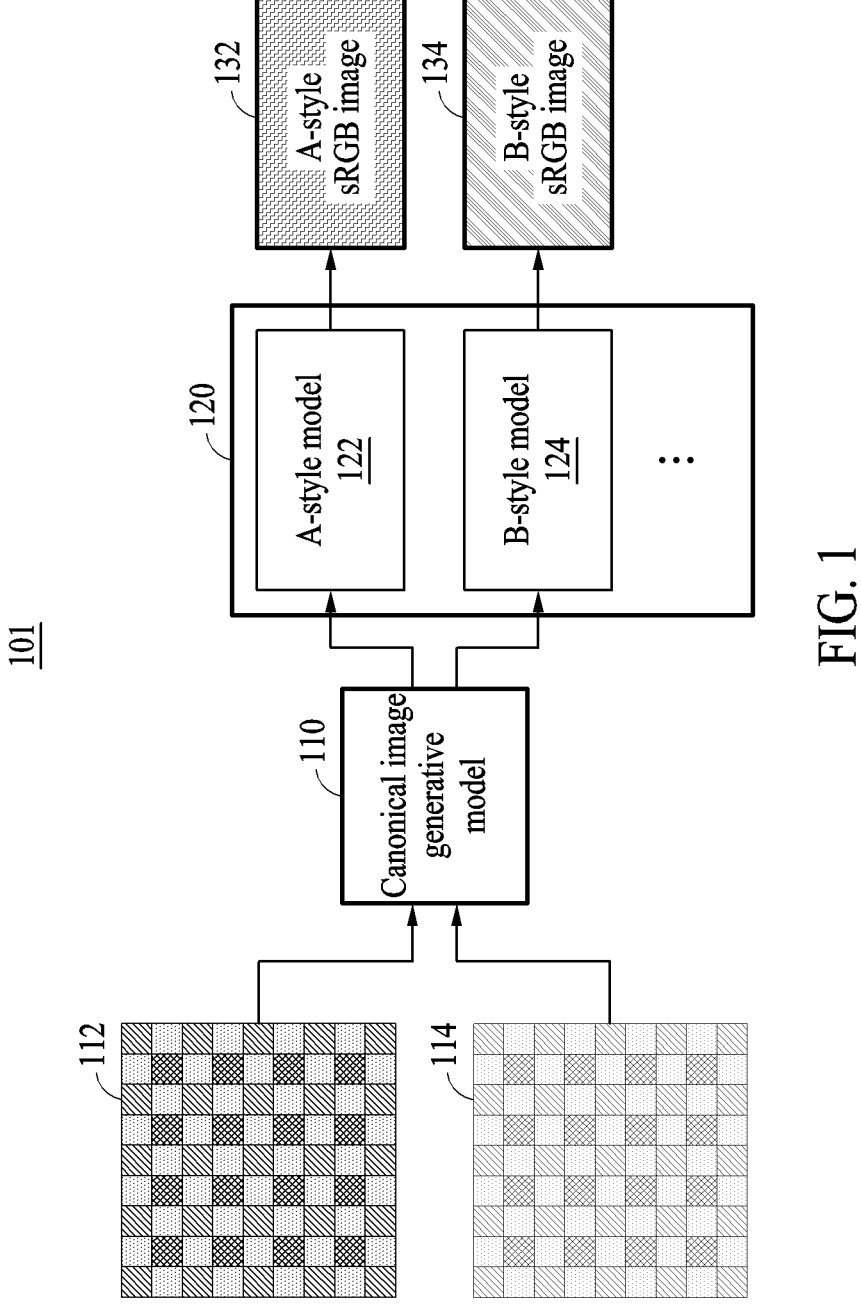
FIG. 1 is a diagram illustrating an example of an electronic device for processing an image and a system of a method of controlling the electronic device, according to one or more embodiments.

Throughout the drawings and the detailed description, unless otherwise described or provided, the same or like drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third", or A, B, (a), (b), and the like may be used herein to describe various members, components, regions, layers, portions, or sections, these members, components, regions, layers, portions, or sections are not to be limited by these terms. Each of these terminologies is not used to define an essence, order, or sequence of corresponding members, components, regions, layers, portions, or sections, for example, but used merely to distinguish the corresponding members, components, regions, layers, portions, or sections from other members, components, regions, layers, portions, or sections. Thus, a first member, component, region, layer, portions, or section referred to in the examples described herein may also be referred to as a second member, component, region, layer, portions, or section without departing from the teachings of the examples.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing. As used herein, the term "and/or" includes any and all combinations of one or more of the associated listed items. For example, "A and/or B" may be interpreted as "A," "B," or "A and B.".

The terminology used herein is for the purpose of describing particular examples only and is not to be limiting of the examples. The singular forms "a," "an," and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

An image signal processor (ISP) network may be used in an image processing system that provides an improved result to a user through post-processing of a training signal value captured through an image sensor of a camera. The ISP network may handle generating a 3-channel image (H×W× 3) of a standard Red Green Blue (sRGB) color space by inputting a training image (H×W×1) including an RGB single-channel Bayer pattern. In some examples, since the training image exists in different color spaces according to the types of sensors that capture an image, each sensor may have a different domain even when the same scene is captured.

In some examples, deep camera ISP networks may assume an original input image of a single sensor and may convert the input image into an sRGB image, which is a target canonical color space, as a training image for input to an ISP network. The canonical color space may be a standardized color space and may be accepted as a reference for color accuracy and consistency. The canonical color space may be used as a common reference point for color management across different devices, such as digital cameras, displays, printers, and software applications. The canonical color spaces may be designed to be device-independent, and some examples of canonical color spaces are sRGB, Adobe RGB, and ProPhoto RGB.

In some examples, an ISP network may be trained through end-to-end supervised training using sRGB-paired data. When an original input image is received through a new sensor, training data may have to be collected again from the beginning due to differences in the hardware between the sensors, and the entire ISP? network must be newly trained, and the resulting sRGB image may be adjusted or the target image may be improved. Such a training burden may be burdensome, considering the cost of data collection. In addition, since an output sRGB image is collected from one sensor and trained through supervised training, a target domain may be fixed to a single domain and may not be adjusted. Such issues may cause inefficiency since the process of data generation, supervised training, and network tuning may need to be revisited each time that a device equipped with a new sensor is released in a rapidly changing camera market.

The examples disclosed herein may provide a 2-step-based ISP network that is capable of changing a method of processing an input/output image (e.g., for different sensors) without retraining the entire ISP network. This may eliminate issues arising out of the domain change of an input/output image in the end-to-end supervised training described above. A network structure provided herein may generate various converted images according to a purpose, for example, performing rendering on different training images captured by different sensors into the style of another sensor or performing rendering to serve the purpose of use. An ISP trained by methods of the present disclosure may reduce the amount of training according to various purposes by replacing only some of training models.

An electronic device for processing an image through a canonical space and a method of controlling the electronic device may be applied to an image processing product group utilizing artificial intelligence (AI) computing or a neural processor related to deep image processing; a mobile camera; training image processing of a general camera; a sensor-equipped device; and ISP tuning. In addition, the methods and apparatuses disclosed herein may convert training images in various domains into a canonical space and then into a certain target domain, and thus, may be applied to a multi-domain image processing area of a general computer vision task, for example.

FIG. 1 is a diagram illustrating an example of an electronic device for processing an image and a system of a method of controlling the electronic device.

Referring to FIG. 1, a system 101 for processing an image through a canonical space may include a canonical image generative model 110 and an image effect augmentation model 120. The canonical image generative model 110 may output a correction matrix that receives a training image histogram as an input and converts the received training image histogram into a canonical color space having a canonical illumination, and the image effect augmentation model 120 may perform post-correction, according to various image styles, on the converted training image histogram. The system 101 may perform initial training about an image histogram through the canonical image generative model 110 and perform training about post-correction according to a style through the image effect augmentation model 120.

In some examples, the canonical image generative model 110 may receive a training image 112 and a training image 114. FIG. 1 illustrates only two training images (e.g., the training images 112 and 114), which are obtained through different sensors for the training image 112, but the number of different sensors is not limited to two. The number of training images and the number of sensors may be varied with deviating from the spirit and scope of the illustrative examples described. Generating a first conversion image obtained by converting the training image 112 received by the canonical image generative model 110 is further described with reference to FIGS. 2 and 3 below.

The canonical image generative model 110 may generate second conversion images obtained by converting illumination values of the training images 112 and 114, removing a color space difference and an illumination difference due to different sensors and lighting. The second conversion images may be normalized and converted in the canonical space of a canonical color space and a canonical illumination/lighting space.

In some examples, the canonical image generative model 110 may be a general image manipulation neural network including a plurality of layers. The plurality of layers may include an input layer, at least one hidden layer, and an output layer. The neural network may be a convolutional neural network. In the non-output layers, an input image or map may be convoluted with filters/kernels, and as a result, a plurality of intermediate feature maps may be generated. The intermediate feature maps may be again convoluted in a subsequent convolutional layers as input feature maps with another kernel of the subsequent layers, and new intermediate feature maps may be output. After the convolution operations are repeatedly performed, and potentially, other layer operations performed, the recognition or classification results of features of the input image (e.g., as generated by the output layer, e.g., a fully connected layer) may be output through the neural network.

The neural network, convolutional neural network (CNN), or deep neural network (DNN) may generate mapping between input information and output information, and may have a generalization capability to infer a relatively correct output with respect to input information that has not been used for training. The neural network may be a general model that has an ability to solve a problem or perform tasks, as non-limiting examples, where nodes arranged in layers form the network through connections and other parameters are adjusted through training.

In some examples, training an artificial neural network may involve determining and adjusting weights and biases between layers or weights and biases among a plurality of nodes belonging to different layers adjacent to one another, as only non-limiting examples of such parameters.

The canonical image generative model 110 may be trained based on a loss function, so that all of the training images 112 and 114 and the second conversion images obtained by converting illumination values of the training images 112 and 114, respectively, are identical to each other. The canonical image generative model 110 may be a white balanced sensor independent space (WB-SIS) module and may generate images with accurate color reproduction that is independent of the sensor used to capture the image. Generating the second conversion images obtained by converting illumination values is further described with reference to FIG. 4 below.

The image effect augmentation model 120 may convert a result of the canonical image generative model 110 (the result being in the canonical space that includes the canonical color space and the canonical illumination space) into an sRGB image according to a final target. The image effect augmentation model 120 may be trained using a loss based on a distance between the sRGB image and a corresponding ground truth (GT) image. Through the process described above, the image effect augmentation model 120 may convert a canonical space image into an A-style sRGB image 132 or a B-style sRGB image 134 according to a style in line with a purpose of using an output image (e.g., an A-style model 122 or a B-style model 124). The image effect augmentation model 120 may be trained end-to-end together with the canonical image generative model 110. As described above, since the system 101 may independently perform image processing training in 2-steps in the canonical image generative model 110 and the image effect augmentation model 120, the system 101 may be trained by an image data set of multi-purposes and multiple input sensor domains. Thus, it is possible to perform image conversion into the canonical space through the canonical image generative model 110 without constraints of an input sensor domain, so that the system 101 may replace and tune the image effect augmentation model 120 according to a purpose.

Figure 2A:
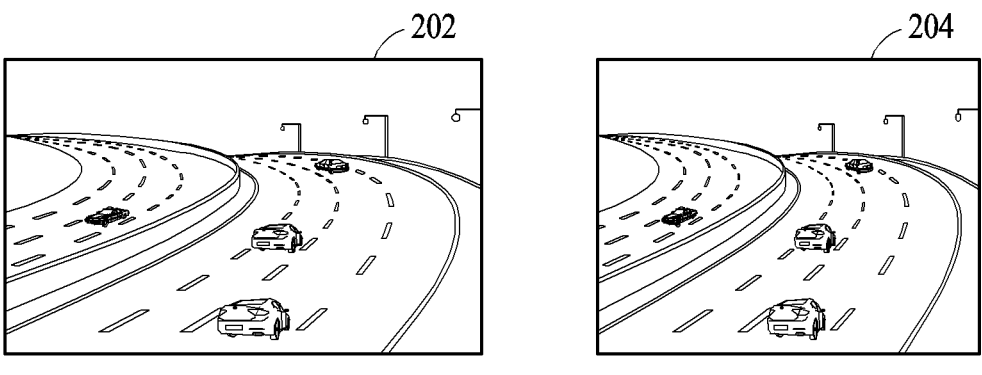
FIGS. 2A and 2B are diagrams illustrating examples of operations in which an electronic device for processing an image generates an image having a converted pixel through a canonical space, according to one or more embodiments.
Figure 2B:
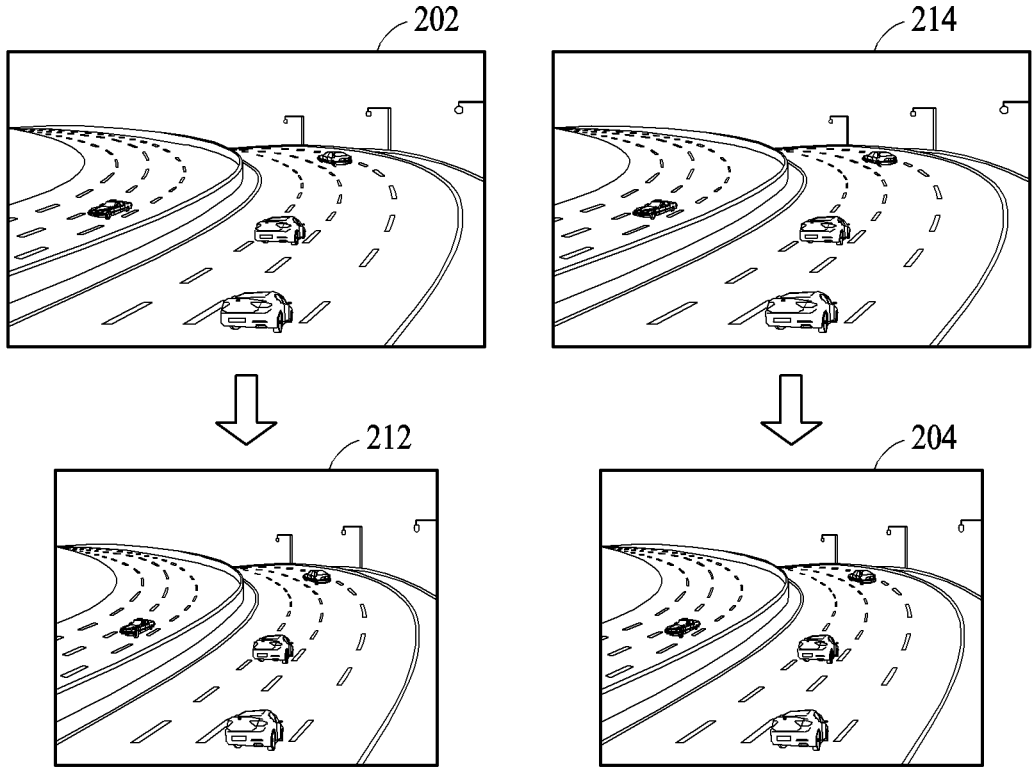

FIGS. 2A and 2B are diagrams illustrating examples of an operation in which an electronic device for processing an image generates a first conversion image having pixels converted pixel through a canonical space.

As shown in FIG. 1, since the electronic device is trained through an end-to-end supervised training method, a pair of a training image and a target image (e.g., a raw image and an sRGB image) may be used to train an image processing model. However, since the training target of a canonical image generative model is a canonical space including a canonical color space and a canonical illumination space, in which a difference between sensors is corrected, a conversion image corresponding to the same scene captured by two or more sensors may be used to train the canonical image generation model. It may be assumed that following diagrams and the detailed description are based on two different sensors, but the present disclosure is not limited thereto.

FIG. 2A illustrates training images 202 and 204 obtained through different sensors for the same scene. It may be seen that the training image 202 obtained through a sensor A may not be completely identical to the training image 204 obtained through a sensor B due to differences, such as a hardware difference between the sensors. The electronic device may generate first conversion images by maintaining the color value of a training image through image conversion based on a homogeneous transform, considering a difference in sensors, and by converting the pixel value of the training image into the pixel value of another sensor. Referring to FIG. 2B, the electronic device may convert the pixel values of the training image 202 obtained through the sensor A into the pixel values of the sensor B and thus obtain a first conversion image 212. Similarly, the electronic device may convert the pixel values of the training image 204 obtained through the sensor B into the pixel values of the sensor A and thus obtain a first conversion image 214.

Figure 3A:
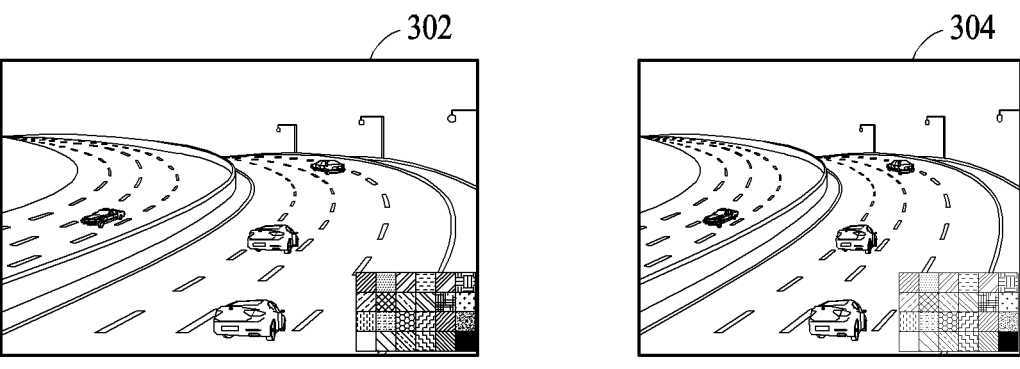
FIGS. 3A and 3B are diagrams illustrating examples of operations in which an electronic device for processing an image generates an image having a converted color through a canonical space, according to one or more embodiments.
Figure 3B:
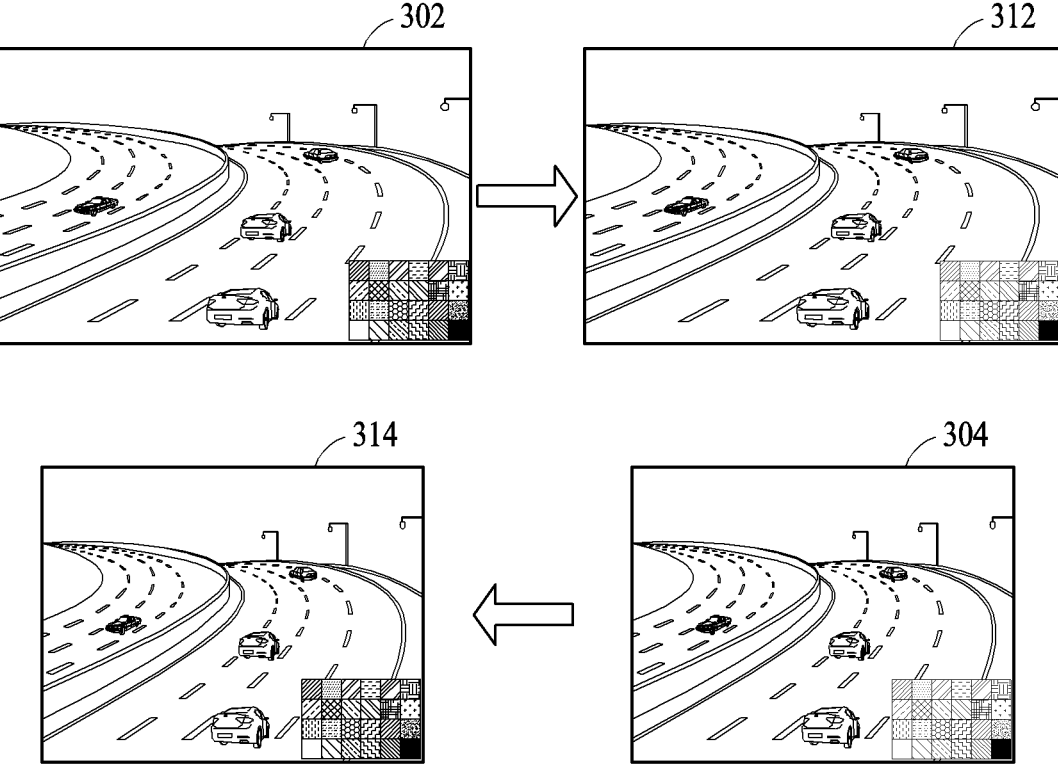

FIGS. 3A and 3B are diagrams illustrating examples of operations in which an electronic device for processing an image generates an image having a converted color through a canonical space.

As described with reference to FIGS. 1 and 2, since the electronic device is trained through an end-to-end supervised training method, a pair of a training image and a target image (e.g., a pair of a raw image and an sRGB image) may be used to train the image processing model. However, since the training target of the canonical image generative model is a canonical space including a canonical color space and a canonical illumination space, in which a difference between sensors is corrected, training images of the same scene captured by two or more sensors may be used to train the canonical image generation model. The following diagrams and the description are based on two sensors as described with reference to FIG. 2, but other number of sensors may be used without deviation from the spirit and scope of the illustrative examples described.

Referring to FIG. 3A, training images 302 and 304 may be obtained through different sensors for the same scene. In some examples, the training image 302 obtained through a sensor A is not completely the same as the training image 304 obtained through a sensor B due to differences between the sensors, such as hardware differences. In some examples, the electronic device may maintain the pixel value of a training image through image conversion using a Macbeth Color Chart, considering a difference in sensors, and generate first conversion images that are converted into an image corresponding to the same scene by converting the color value of the training image into the color value of another sensor. Referring to FIG. 3B, the electronic device may, for example, obtain a first conversion image 312 by converting the color value of the training image 302 obtained through the sensor A into the color value of the sensor B. Similarly, the electronic device may obtain a first conversion image 314 by converting the color value of the training image 304 obtained through the sensor B into the color value of the sensor A.

Figure 4:
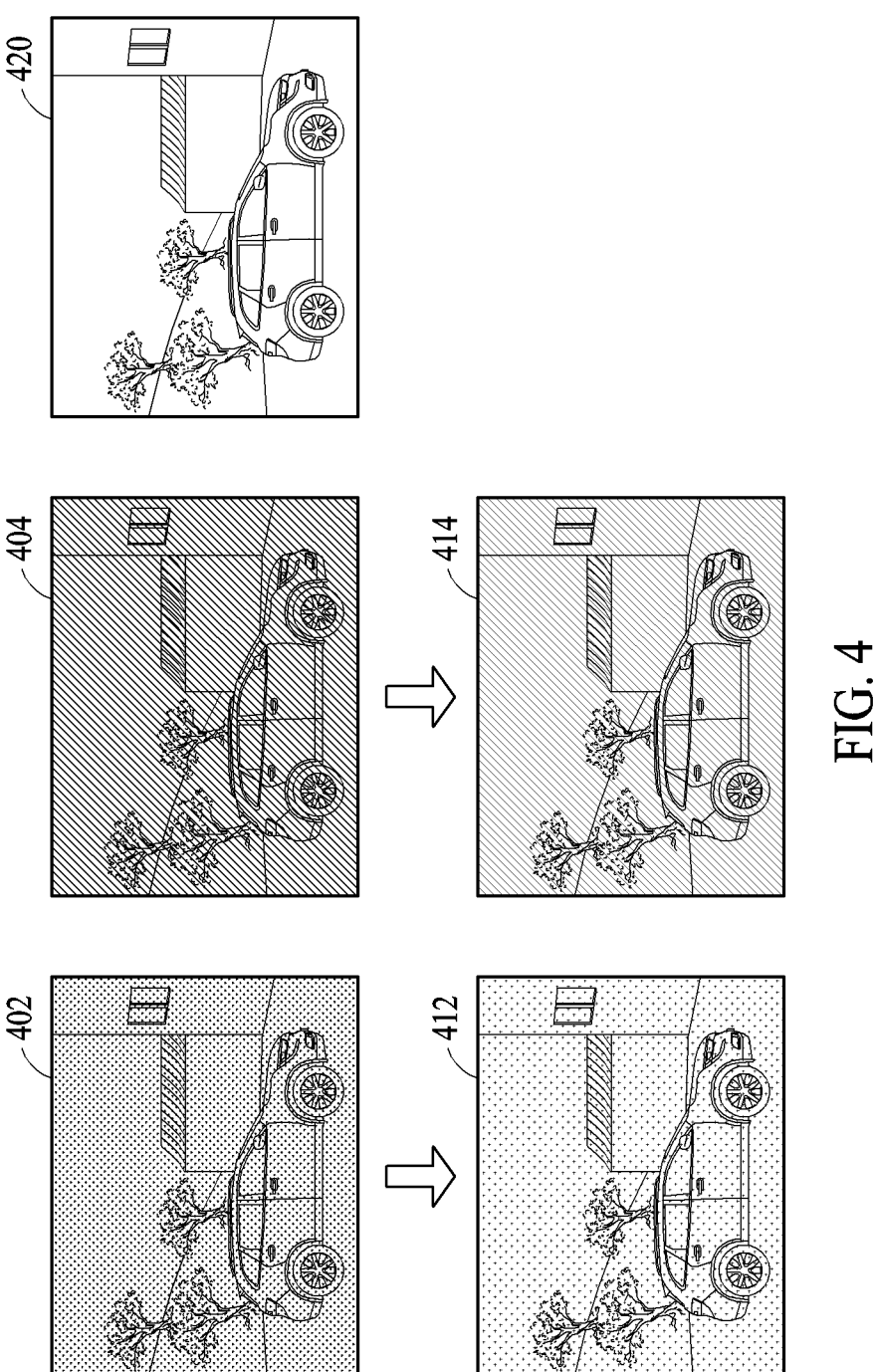
FIG. 4 is a diagram illustrating an example of input images for training in an electronic device for processing an image through a canonical space, according to one or more embodiments.

FIG. 4 is a diagram illustrating an example of input images for training in an electronic device for processing an image through a canonical space.

Referring to FIG. 4, the electronic device may obtain a training image 402 and a first conversion image 404 as input images for training an image processing model, through the conversion processes described with reference to FIGS. 2 and 3. The electronic device may be trained using an sRGB image obtained by the same sensor as a sensor that obtained the training image 402 as a GT image 420. In this case, since the input images are only the training image 402 and the first conversion image 404 corresponding to the same scene as the training image 402, the electronic device may assume that a single illumination is uniformly distributed in the scene and may arbitrarily adjust an R color value and a B color value and thus obtain second conversion images 412 and 414 through a method of global illumination manipulation. As described with reference to FIGS. 1 to 3, it may be assumed that there are two different sensors, and one illumination conversion image is generated for each of the two different sensors in the diagrams. However, embodiments according to the present disclosure are not limited thereto and different number of sensors and types of illumination may be used without deviation from the spirit and scope of the illustrative examples described.

In this case, a pair of images for training for the same scene may be any two of images: a training image obtained through a sensor A; a first conversion image obtained by converting a training image obtained through a sensor B into an image having the same timepoint as the sensor A; a second conversion image of the training image obtained through the sensor A; an sRGB image obtained through the sensor A or the training image obtained through the sensor B; a first conversion image obtained by converting the training image obtained through the sensor A into an image having the same timepoint as the sensor B; a second conversion image of the training image obtained through the sensor B; and an sRGB image obtained through the sensor B. However, the present disclosure may not be limited thereto and other training images may be used without deviation from the spirit and scope of the illustrative examples described. The electronic device may obtain an image of a sensor independent space and an image of a white balanced space, through a training image obtained through another sensor and an image with a manipulated color, in addition to a pair of the training image 402 and the GT image 420 obtained through the same sensor as the training image 402.

Figure 5:
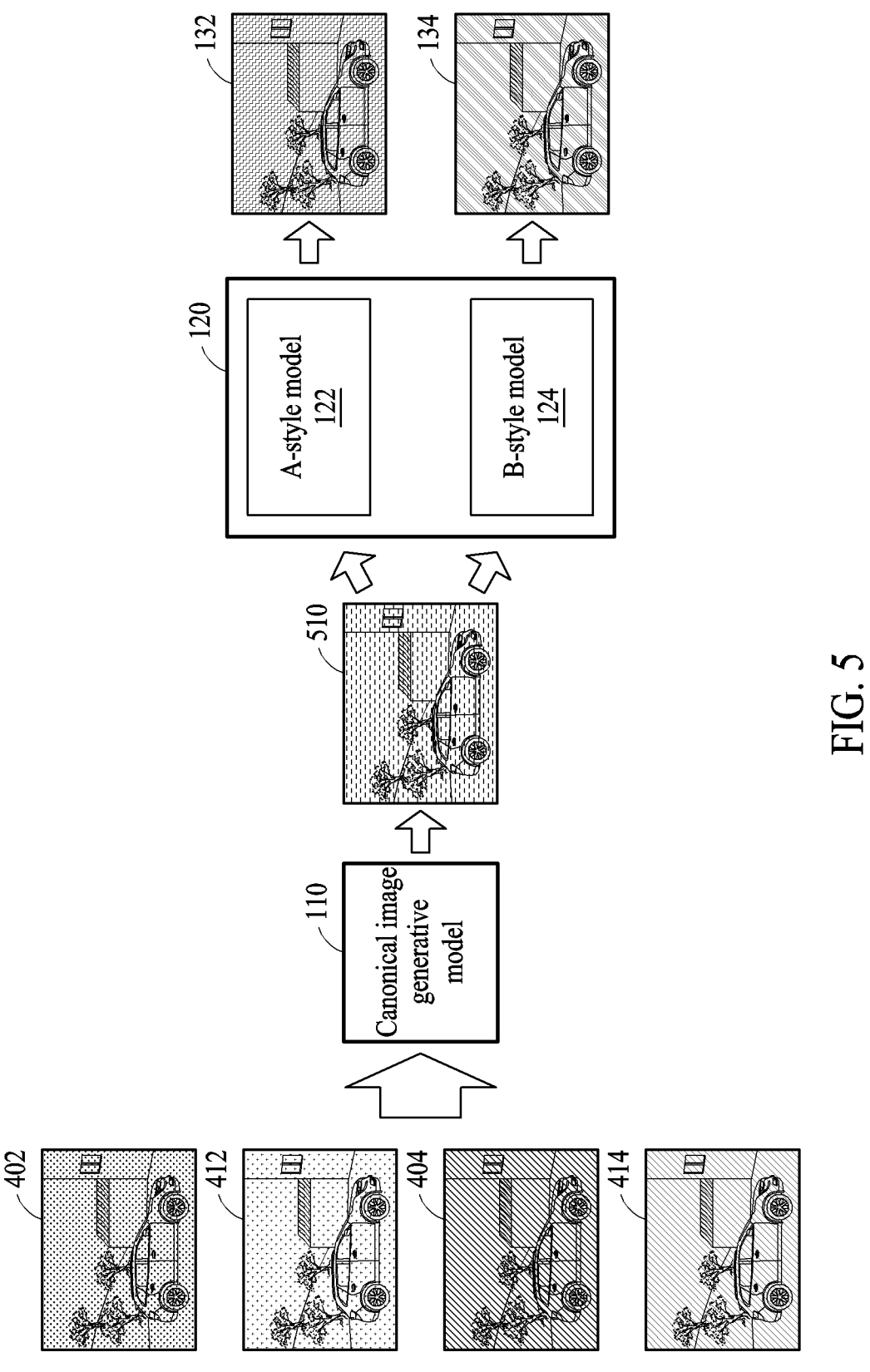
FIG. 5 is a diagram illustrating an example of an operation of each component of an electronic device for processing an image through a canonical space, according to one or more embodiments.

FIG. 5 is a diagram illustrating an example of an operation of each component of an electronic device for processing an image through a canonical space.

Referring to FIG. 5, the electronic device may use, as input images for training, the first conversion image 404, the training image 402, and second conversion images 412 and 414 generated by changing the R channel value and the B channel value of the training image 402 and the first conversion image 404 and applying a uniformly-distributed single illumination to the first conversion images with the R channel value and the B channel value changed. In some examples, the canonical image generative model 110 of the electronic device may be based on a CNN model. The canonical image generative model 110 of the electronic device may receive input images (e.g., the images 402, 404, 412, and 414) for training.

The canonical image generative model 110 may be trained to minimize a loss function determined based on a difference between a reference image and each of outputs obtained by outputting the input images through the canonical image generative model 110. In this case, the reference image may be an sRGB image, and the reference image may be obtained by the same sensor that obtains the training image 402. The training image 402, the first conversion image 404, and the second conversion images 412 and 414 may all need to map to the same color space after passing through the canonical image generative model 110 and may thus be trained through the same loss function (e.g., a distance-based loss, such as L1 loss). The second conversion images 412 and 414 may be generated by changing the R channel value and the B channel value of the training image 402 and the first conversion image 404 and by applying a uniformly-distributed single illumination to the first conversion images with the R channel value and the B channel value changed.

Figure 6:
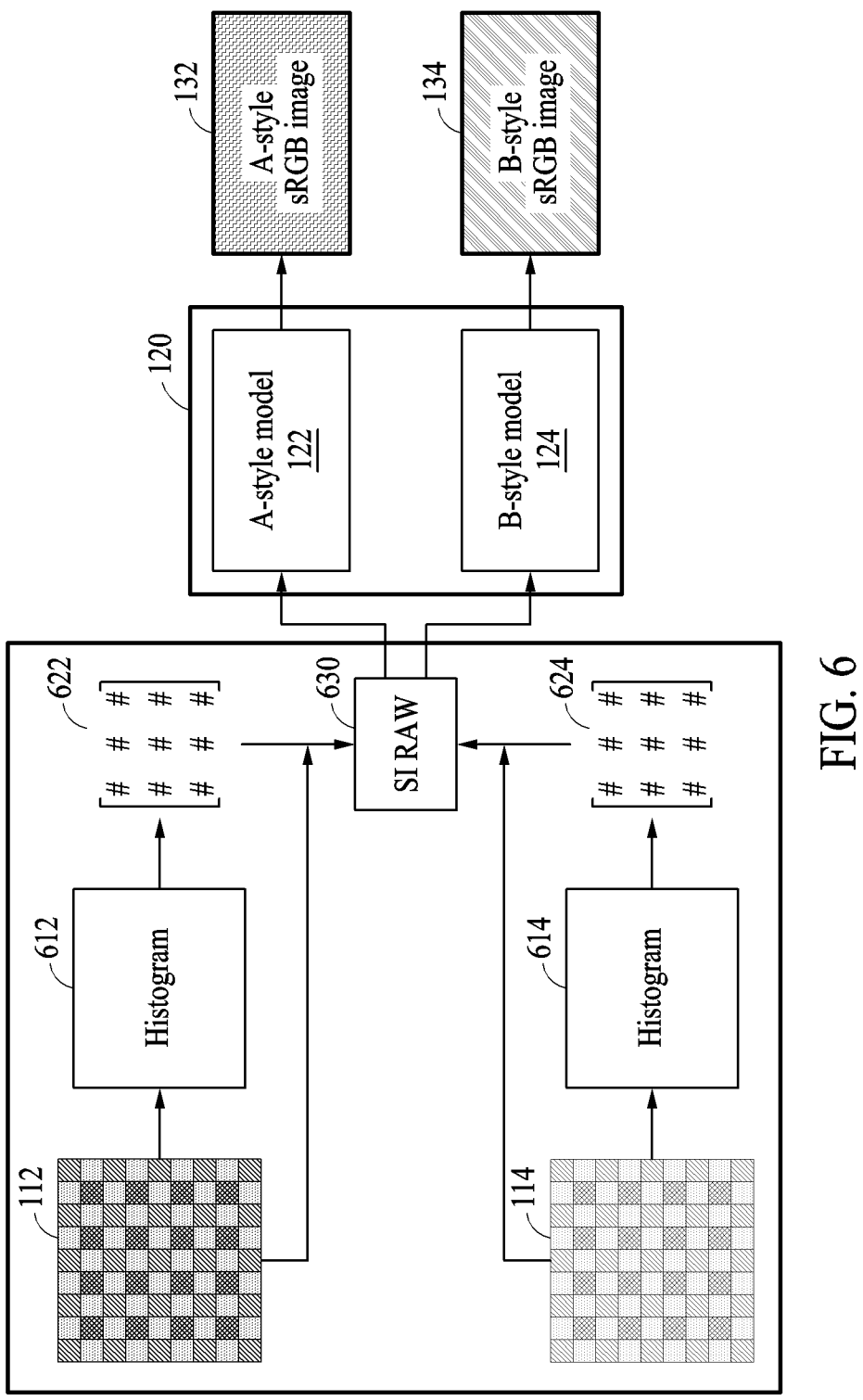
FIG. 6 is a diagram illustrating an example of a method of processing an image through a canonical space, according to one or more embodiments.

FIG. 6 is a diagram illustrating an example of a method of processing an image through a canonical space.

Referring to FIG. 6, the training image 112 obtained through the sensor A and the training image 114 obtained through the sensor B may be input to the canonical image generative model 110. The input training images 112 and 114 may be output in the form of histograms 612 and 614, respectively, through processing of an RGB-uv histogram block. The histogram 612 and the histogram 614 may be output as a conversion matrix 622 and a conversion matrix 624 through matrix transformation, respectively. The canonical image generative model 110 may obtain a sensor independent raw image (SI-RAW) 630, which is a canonical space image in which the conversion matrix 622 and the conversion matrix 624 explicitly map to a canonical color space and a canonical illumination space. The SI-RAW 630 obtained may be input to the 120. The image effect augmentation model 120 may augment an image effect into a style in line with a purpose of a sensor manufacturer or a user according to each of style models (e.g., the A-style model 122 or the B-style model 124). The image effect augmentation model 120 may output a target image (e.g., the A-style sRGB image 132 or the B-style sRGB image 134) based on an augmented canonical space image. The image effect augmentation model 120 may be, for example, different for each manufacturer and may output sRGB images of different styles. In some examples, the sRGB images may need to be the same as a GT image through the distance-based loss function, such as L1 loss.

The image effect augmentation model 120 may be trained by a global operation method that outputs a conversion matrix as in the canonical image generative model 110 or by a local operation method of a CNN/encoder-decoder. The image effect augmentation model 120 may be trained by using both methods. When the image effect augmentation model 120 has an image-to-image structure, the image effect augmentation model 120 may be trained and implemented without limitation to embodiments herein.

When the optical characteristic of the training image 112 obtained through the sensor A and the training image 114 obtained through sensor B differ greatly due to the hardware characteristics of different lenses, the image effect augmentation model 120 may augment an image effect into a style according to the purpose provided by a sensor manufacturer. In another example, the image effect augmentation model 120 may augment an image effect in a style suitable for a purpose desired by the user. Since mapping to the canonical space may be output as a conversion matrix value, the image effect augmentation model 120 may perform a prior correction according to various purposes and additionally apply a canonical space mapping matrix.

Figure 7:
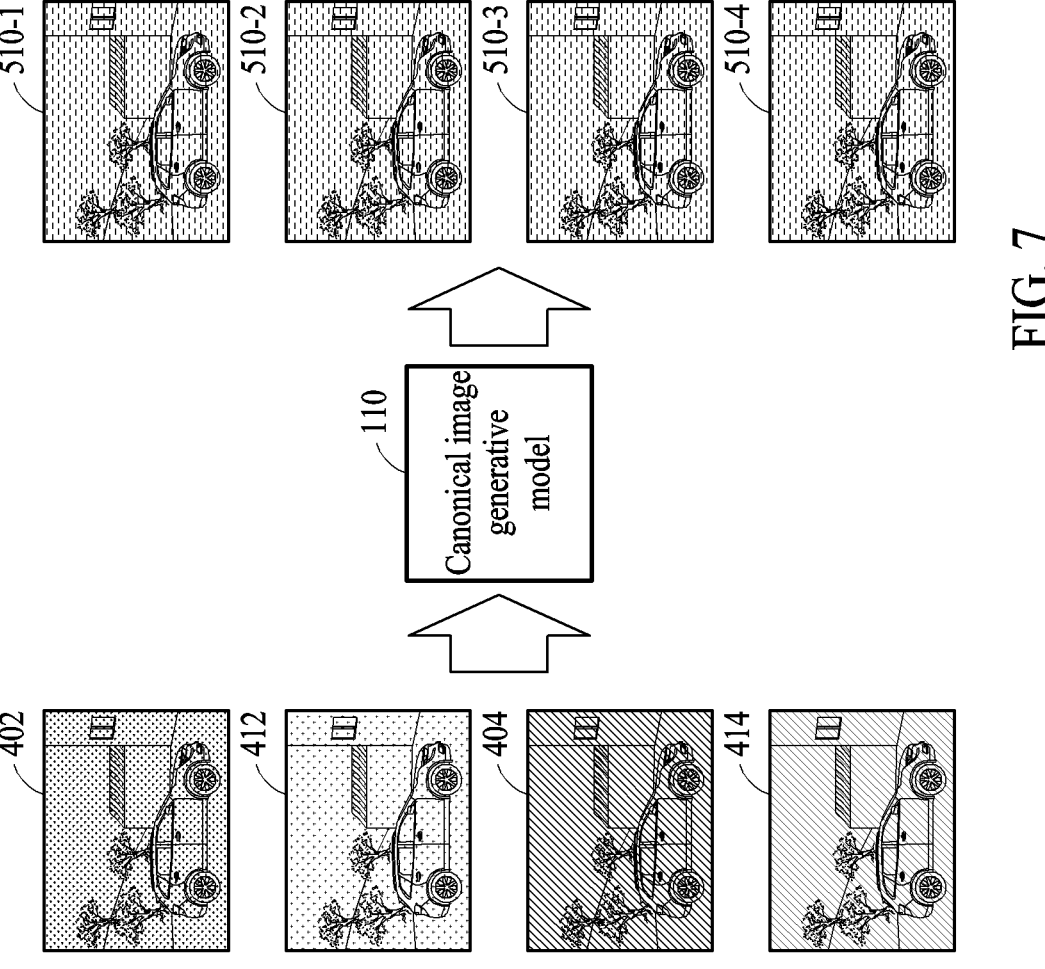
FIG. 7 is a diagram illustrating an example of a method of processing an image by using a CIE XYZ image, in a method of processing an image through a canonical space, according to one or more embodiments.

FIG. 7 is a diagram illustrating an example of a method of processing an image by using a CIE XYZ image, in a method of processing an image through a canonical space.

Referring to FIG. 7, the canonical image generative model 110 may receive the input images 402, 412, 404, and 414 and obtain canonical space images 510-1, 510-2, 510-3, and 510-4 for the input images, respectively. The canonical image generative model 110 may be trained by receiving, as inputs, images having different sensors and different illumination domains and using a loss function related to self-similarity loss to cause output images to be the same. In some examples, the canonical image generative model 110 may be trained based on CIE XYZ coordinate values in an image 710, which is a target to be trained. In some examples, the CIE XYZ color space is a three-dimensional color space that represents all colors visible to the human eye. The canonical image generative model 110 may be trained by considering the similarity of each of the canonical space images 510-1, 510-2, 510-3, and 510-4 and the similarity of the image 710, which is the target to be trained.

Figure 8:
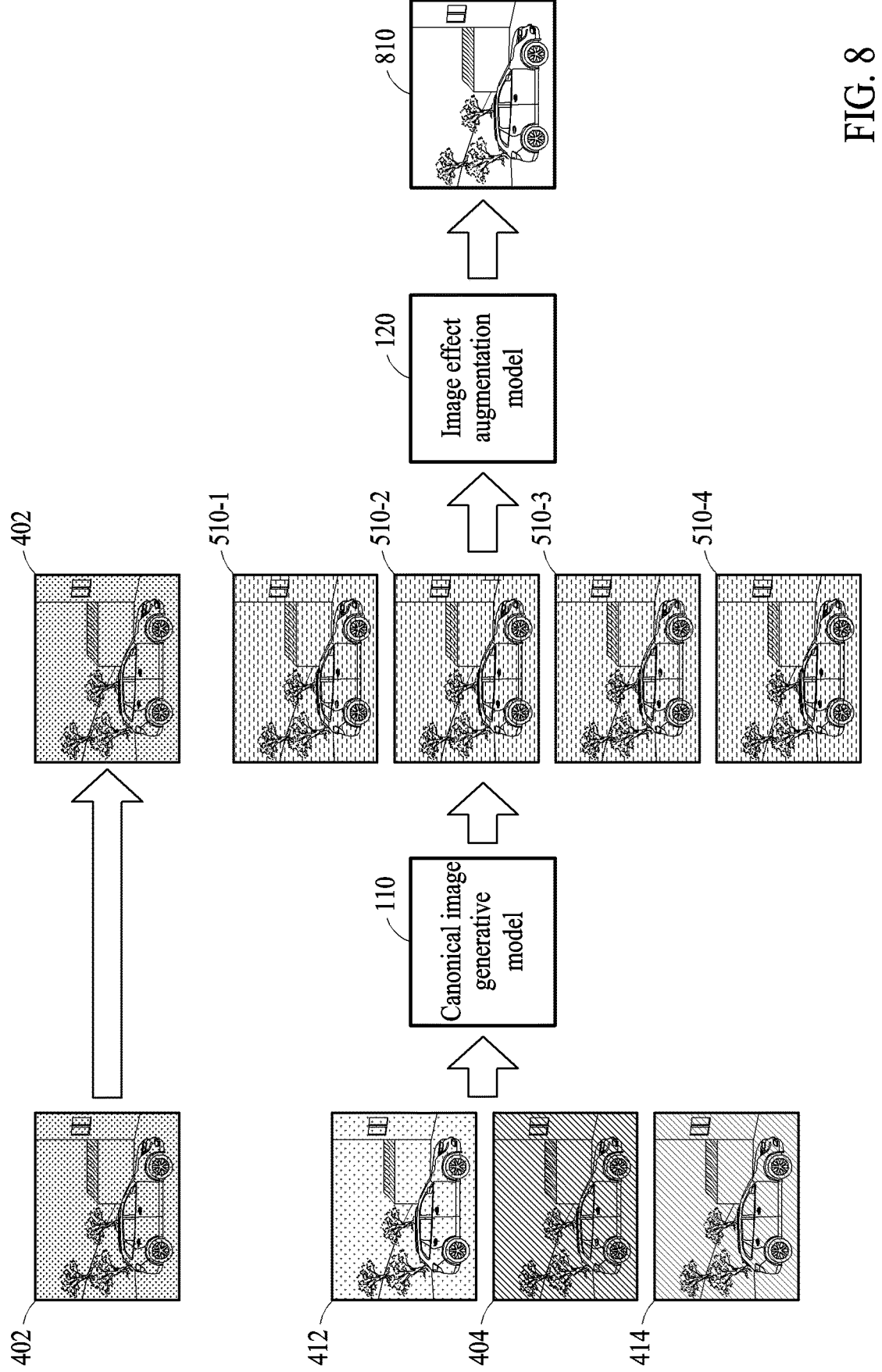
FIG. 8 is a diagram illustrating an example of a method of processing an image by using a training image, in a method of processing an image through a canonical space, according to one or more embodiments.

FIG. 8 is a diagram illustrating an example of a method of processing an image by using a training image, in a method of processing an image through a canonical space.

Referring to FIG. 8, the canonical image generative model 110 may receive the input images 402, 412, 404, and 414 as inputs and obtain the canonical space images 510-1, 510-2, 510-3, and 510-4 for the input images, respectively. The canonical image generative model 110 may be trained by taking images having different sensors and different illumination domains as inputs and using a loss function related to self-similarity loss to cause output images to be the same. However, the canonical image generative model 110 may be trained by concatenation of the training image 402, which is existing, with the canonical space images as an input image of the image effect augmentation model 120. That is, since illumination information of the training image 402, which is existing, may be lost in the output of the canonical image generative model 110, which is normalized to a canonical space image, the canonical image generative model 110 may be trained by concatenation with the training image 402, which is existing.

Figures 9A, 9B, 9C:
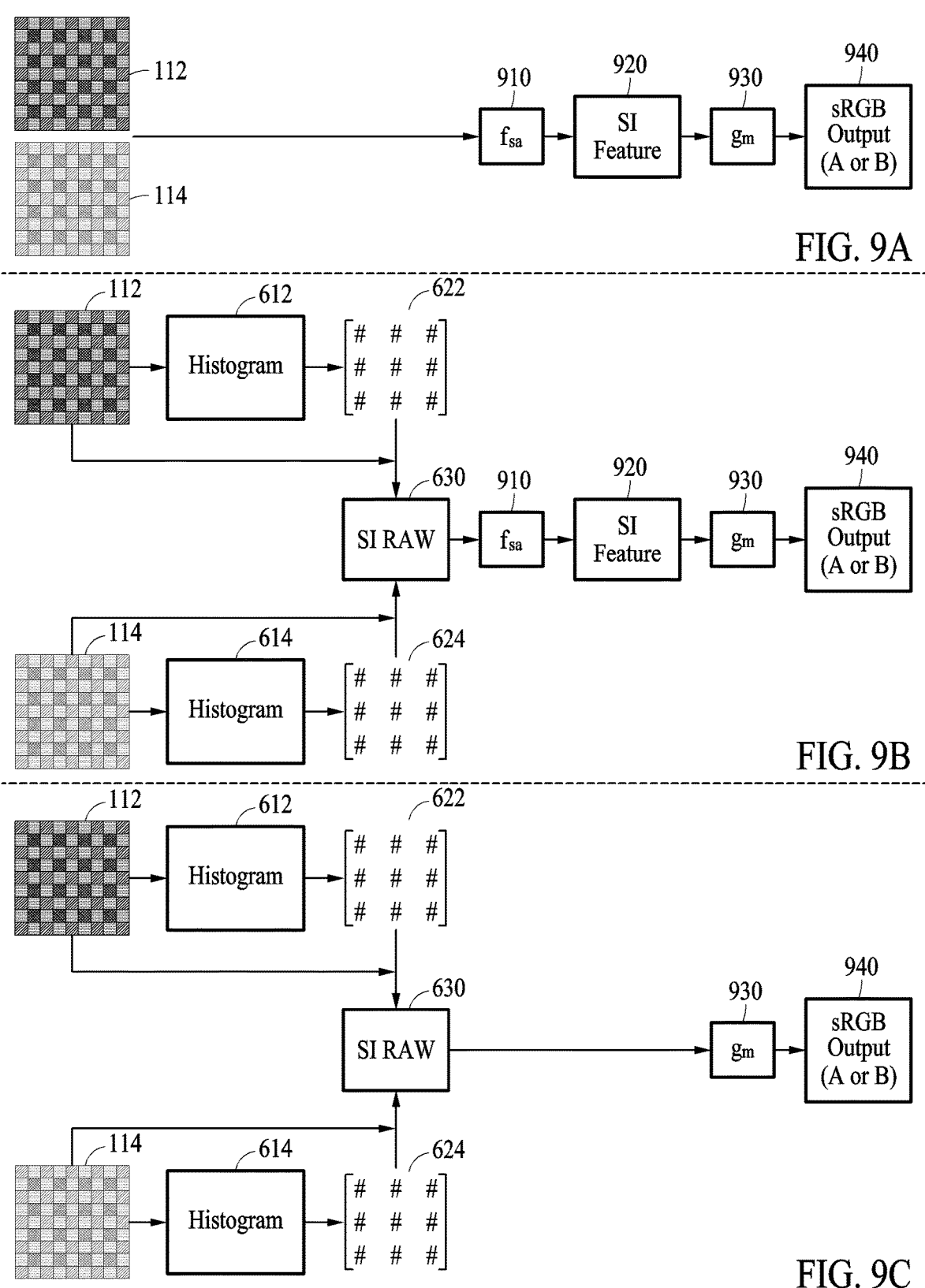
FIGS. 9A to 9C are diagrams illustrating examples of a configuration of an electronic device for processing an image through a canonical space, according to one or more embodiments.

FIGS. 9A to 9C are diagrams illustrating examples of a possible configuration of an electronic device for processing an image through a canonical space.

Referring to FIGS. 9A-9C, the SI-RAW 630 may be an image explicitly mapping to a canonical color space and a canonical illumination space by using a conversion matrix, as described with reference to FIG. 6. An SI-Feature 920 may be a result mapping to a latent feature space of the canonical color space and the canonical illumination space.

Referring to FIG. 9A, the training image 112 obtained through the sensor A and the training image 114 obtained through the sensor B may be processed through $f_{sa}$ 910 and converted to SI-Feature 920, which may then be output as a target image 940 through an image effect augmentation process 930.

Referring to FIG. 9B, as shown in FIG. 6, the training image 112 obtained through the sensor A and the training image 114 obtained through the sensor B may be converted into the histograms 612 and 614 and then output as the conversion matrix 622 and the conversion matrix 624, respectively. The conversion matrix 622 and the conversion matrix 624 may then be processed through $f_{sa}$ 910 after mapping to the SI-RAW 630, which is the image explicitly mapping to the canonical illumination space. The images may map to the SI-Feature 920 and pass through the image effect augmentation process 930 to be output as the target image 940.

Referring to FIG. 9C, as shown in FIG. 6, the training image 112 obtained through the sensor A and the training image 114 obtained through sensor B may be converted into the histograms 612 and 614 and then be output as the conversion matrix 622 and the conversion matrix 624, respectively, and may then pass through the image effect augmentation processing 930 to be output as the target image 940 after mapping to the SI-RAW 630, which is the image explicitly mapping to the canonical illumination space.

That is, through the configuration described with respect to FIGS. 9A to 9C, the electronic device may have a reduced amount of calculations to variously output the target images 940 through the SI-RAW 630 without an additional calculation of the SI-Feature 920, which is not an explicit image but a result mapping to the latent feature space of the canonical color space and the canonical illumination space.

Figure 10:
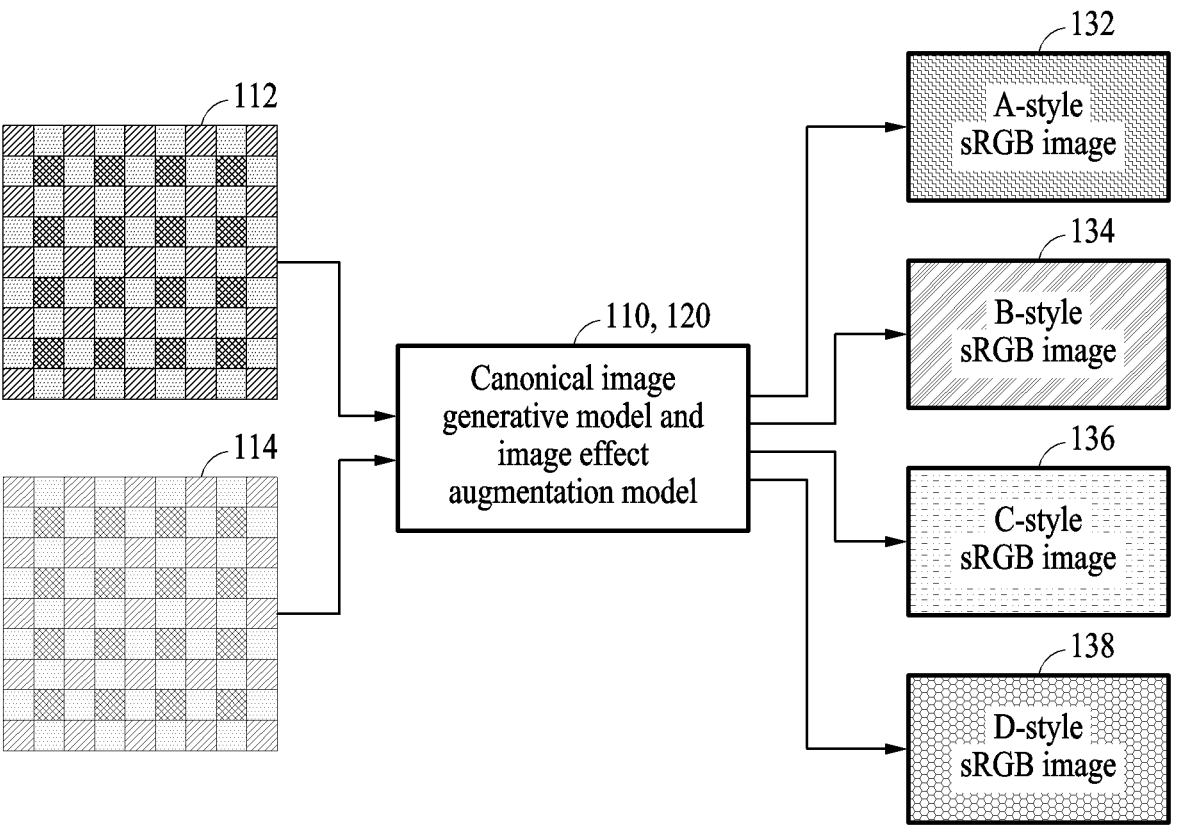
FIG. 10 is a diagram illustrating an example of enhancing an image effect through an electronic device for processing an image through a canonical space, according to one or more embodiments.

FIG. 10 is a diagram illustrating an example of enhancing an image effect through an electronic device for processing an image through a canonical space.

Referring to FIG. 10, the training image 112 obtained through the sensor A and the training image 114 obtained through the sensor B may be output as sRGB images in various styles (e.g., the A-style sRGB image 132, the B-style sRGB 134, and images 136 and 138) through the canonical image generative model 110 and the image effect augmentation model 120. That is, the image effect augmentation model 120 may not be limited to an sRGB rendering module for each sensor manufacturer and may be used with a photo filter (e.g., a cartoon style or a portrait style) or an image effect augmentation filter (e.g., low illuminance image improvement or a high-definition image). A target image may be an sRGB-type image of a sensor different from the sensor of a training image, an image with different sensitivity from the training image, or an image obtained by applying a different filter from the training image. The target image may not be limited to the examples discussed above, and various other types of target images may be used without deviation from the spirit and scope of the illustrative examples described.

Figure 11:
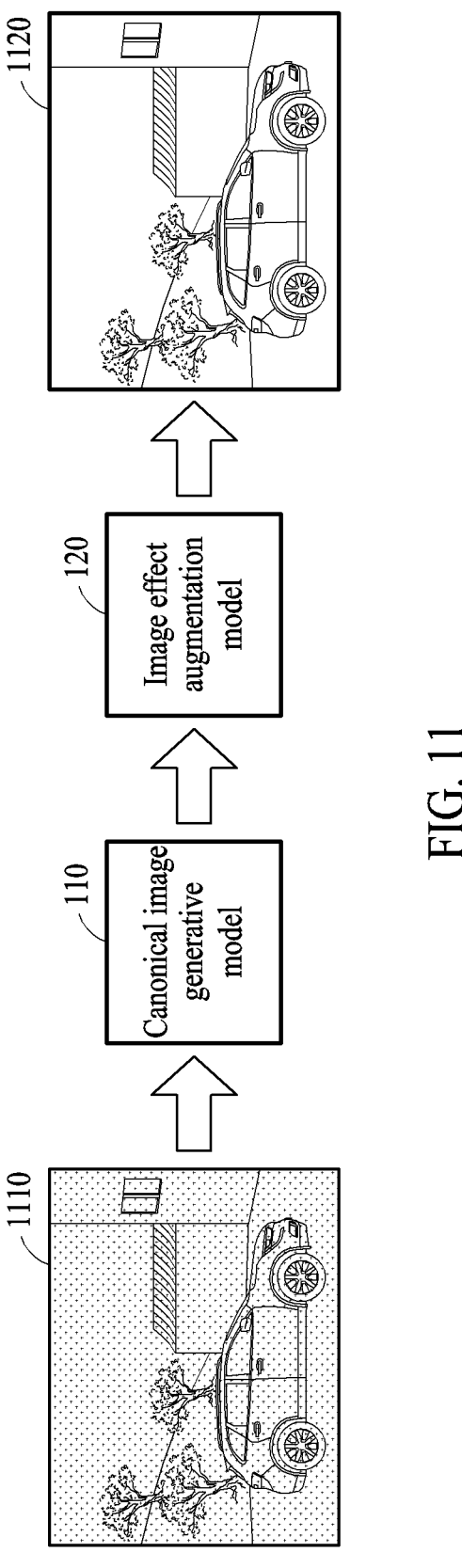
FIG. 11 is a diagram illustrating an example of an electronic device for processing an image through a canonical space, according to one or more embodiments.

FIG. 11 is a diagram illustrating an example of an electronic device for processing an image through a canonical space.

Referring to FIG. 11, the electronic device may receive an input image 1110 obtained through a sensor and obtain a canonical image of a canonical color space and a canonical image of a canonical illuminance space by using the canonical image generative model 110 that takes the input image 1110 as an input. The electronic device may use the image effect augmentation model 120 that takes the canonical images as inputs to obtain a result image 1120 to which image effect augmentation processing is applied. In some examples, the result image 1120 may be an image to which an image effect is applied, so that the input image 1110 obtained through the specific sensor may look the same as an image obtained by a lens having different hardware characteristics from a lens obtaining the input image 1110 or may be an image to which other photo filter functions are applied.

Figure 12:
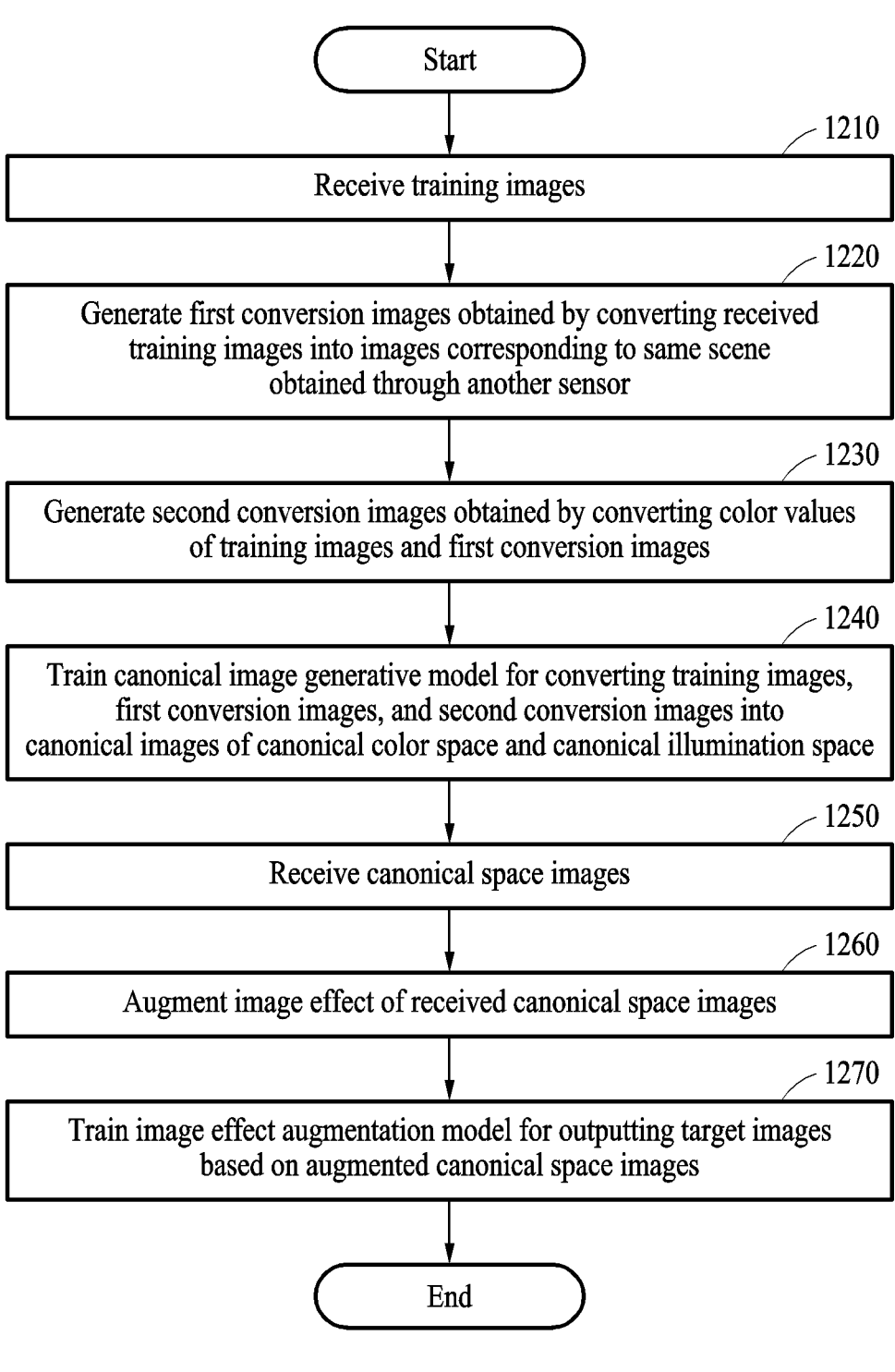
FIG. 12 is a diagram illustrating an example of a training method of an electronic device for processing an image through a canonical space, according to one or more embodiments.

FIG. 12 is a diagram illustrating an example of a training method of an electronic device for processing an image through a canonical space. The operations of FIG. 12 may be performed in the sequence and manner as shown. However, the order of some operations may be changed, or some of the operations may be omitted, without departing from the spirit and scope of the shown example. Additionally, operations illustrated in FIG. 12 may be performed in parallel or simultaneously. One or more blocks of FIG. 12, and combinations of the blocks, can be implemented by a special purpose hardware-based computer that perform the specified functions, or combinations of special purpose hardware and instructions, e.g., computer or processor instructions. For example, operations of the method may be performed by a computing apparatus (e.g., electronic device 1400 of FIG. 14 or electronic device 1500 of FIG. 15). In addition to the description of FIG. 12 below, the descriptions of FIGS. 1-11 are also applicable to FIG. 12.

Referring to FIG. 12, in operation 1210, an electronic device for processing images through a canonical space may receive training images. In some examples, the electronic device may be a training device. In some examples, the training images may include training images obtained through different sensors, such as the training images 112 and 114 of FIG. 6.

In operation 1220, the electronic device may generate first conversion images obtained by converting the received training images into images corresponding to the same scene obtained through another sensor. The generating of the first conversion images may include generating the first conversion images by maintaining a color but converting a pixel or generating the first conversion images by maintaining a pixel but converting a color, as described above with reference to FIGS. 2 and 3.

In operation 1230, the electronic device may generate second conversion images obtained by converting color values of the training images and the first conversion images. The generating of the second conversion images may include generating the second conversion images by changing the R channel value and the B channel value of the first conversion images and applying a uniformly-distributed single illumination to the first conversion images with the changed R channel value and the B channel value, as shown in FIG. 4.

In operation 1240, a canonical image generative model disposed in the electronic device may be trained for converting the training images, the first conversion images, and the second conversion images into canonical images of a canonical color space and a canonical illumination space. In some examples, the canonical image generative model may be based on a CNN model to minimize a loss function and the canonical image generative model may be trained based on a predetermined CIE XYZ coordinate value.

In operation 1250, the electronic device may receive canonical space images. In some examples, the canonical space images may be received through the image effect augmentation model 120 of FIG. 5.

In operation 1260, the electronic device may augment the image effect of the received canonical space images. The image effect may be augmented in various style models (e.g., the A-style model 122 or the B-style model 124 of FIG. 5).

In operation 1270, the electronic device may train an image effect augmentation model for outputting target images based on the augmented canonical space images. The electronic device may train the image effect enhancement model to output sRGB images of various styles (e.g., the A-style sRGB image 132, the B-style sRGB 134, and the images 136 and 138 of FIG. 10).

Figure 13:
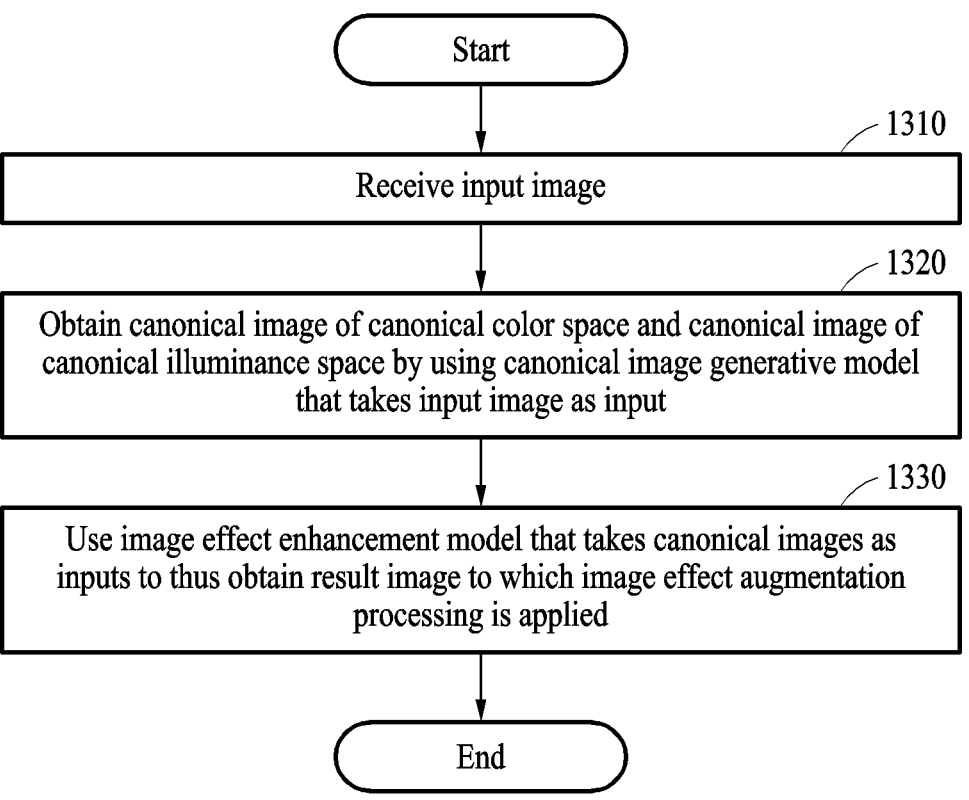
FIG. 13 is a diagram illustrating an example of an electronic device for processing an image through a canonical space, according to one or more embodiments.

FIG. 13 is a diagram illustrating an electronic device for processing an image through a canonical space. The operations of FIG. 13 may be performed in the sequence and manner as shown. However, the order of some operations may be changed, or some of the operations may be omitted, without departing from the spirit and scope of the shown example. Additionally, operations illustrated in FIG. 13 may be performed in parallel or simultaneously. One or more blocks of FIG. 13, and combinations of the blocks, can be implemented by special purpose hardware-based computer that perform the specified functions, or combinations of special purpose hardware and instructions, e.g., computer or processor instructions. For example, operations of the method may be performed by a computing apparatus (e.g., electronic device 1400 of FIG. 14 or electronic device 1500 of FIG. 15). In addition to the description of FIG. 13 below, the descriptions of FIGS. 1-12 are also applicable to FIG. 13.

Referring to FIG. 13, in operation 1310, the electronic device may receive an input image. The input image may be an image obtained through a sensor, such as the input image 1110 of FIG. 11.

In operation 1320, the electronic device may obtain a canonical image of a canonical color space and a canonical image of a canonical illuminance space using a canonical image generative model that takes the input image as an input. As shown in FIG. 13, the canonical image generative model may be trained through the training device of the electronic device for processing images through the canonical space.

In operation 1330, the electronic device may use an image effect enhancement model that takes the canonical images as inputs to obtain a result image to which image effect augmentation is applied. As shown in FIG. 13, the image effect augmentation model may be trained through the training device of the electronic device for processing images through the canonical space.

Figure 14:
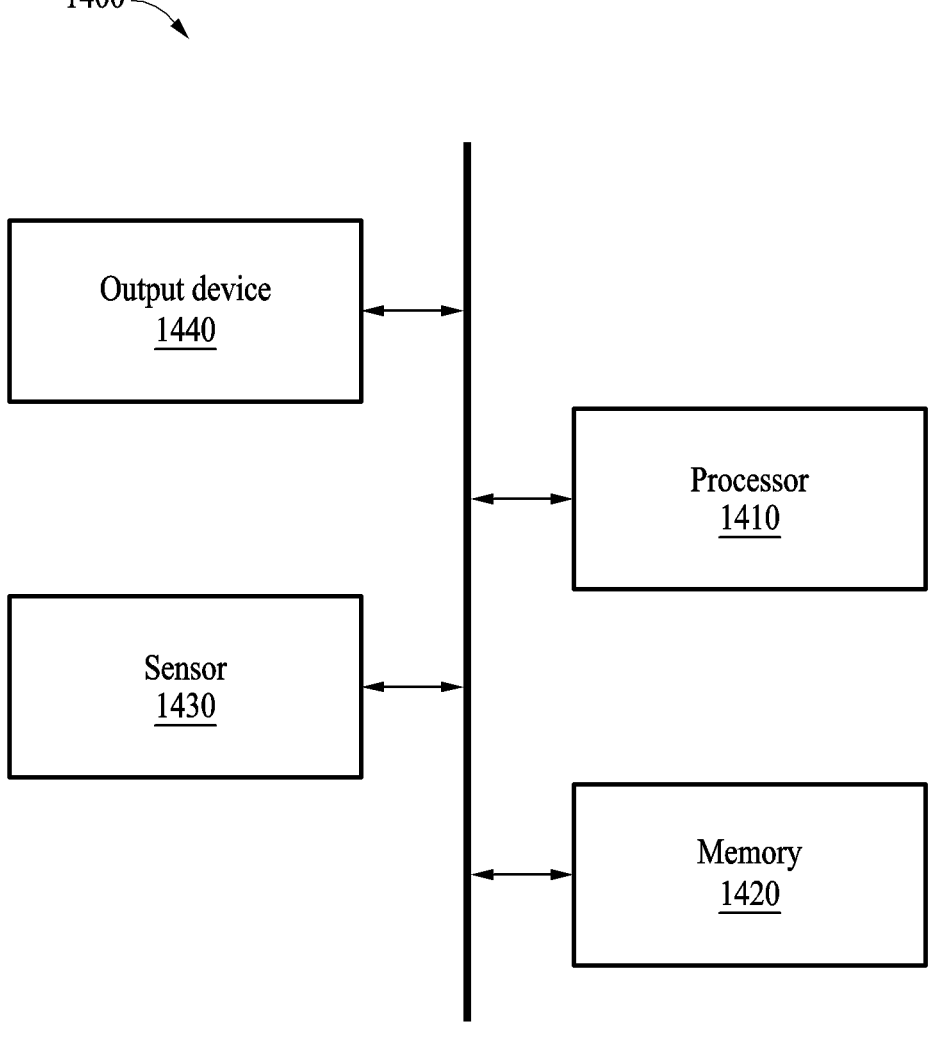
FIG. 14 is a diagram illustrating an example of a configuration of a training device for training a canonical image generative model for processing an image through a canonical space, according to one or more embodiments.

FIG. 14 is a diagram illustrating an example of an electronic device for training a canonical image generative model for processing an image through a canonical space.

Referring to FIG. 14, an electronic device 1400 may include a sensor(s) 1430, a memory 1420, a processor 1410, and a display device 1440. The description provided with reference to FIGS. 1 through 10 and 12 may also apply to FIG. 14.

The memory 1420 may store computer-readable instructions. When the instructions stored in the memory 1420 are executed by the processor 1410, the processor 1410 may process operations defined by the instructions. The memory 1420 may store a pre-trained Artificial Neural Network (ANN) model, such as the canonical image generative model and the image effect augmentation model described above. The memory 1420 may be connected to the processor 1410 and store instructions executable by the processor 1410, data to be computed by the processor 1410, or data processed by the processor 1410. However, this is only an example, and the information stored in the memory 1420 is not limited thereto. In an example, the memory 1420 may store a program (or an application, or software). The stored program may be a set of syntaxes that are coded and executable by the processor 1410 to operate the electronic device 1400. The memory 1420 may include a volatile memory or a non-volatile memory. The volatile memory device may be implemented as a dynamic random-access memory (DRAM), a static random-access memory (SRAM), a thyristor RAM (T-RAM), a zero capacitor RAM (Z-RAM), or a twin transistor RAM (TTRAM).

The non-volatile memory device may be implemented as an electrically erasable programmable read-only memory (EEPROM), a flash memory, a magnetic RAM (MRAM), a spin-transfer torque (STT)-MRAM, a conductive bridging RAM (CBRAM), a ferroelectric RAM (FeRAM), a phase change RAM (PRAM), a resistive RAM (RRAM), a nano-tube RRAM, a polymer RAM (PoRAM), a nano floating gate Memory (NFGM), a holographic memory, a molecular electronic memory device), or an insulator resistance change memory. Further details regarding the memory 1420 are provided below.

The sensor(s) 1430 may include a camera lens, but may not be limited to the examples described. Other sensors such as infra-red sensor, ultra-violet sensor, radio detection and ranging (RADAR), light detection and ranging (LiDAR) sensor may be used without deviating from the spirit or scope of the illustrative examples described.

The processor 1410 may control an overall operation of the electronic device 1400. The processor 1410 may control at least one other component of the electronic device 1400 and perform processing of various pieces of data or computations. The processor 1410 may control an overall operation of the electronic device 1400 and may execute corresponding processor-readable instructions for performing operations of the image restoration apparatus 900. The processor 1410 may execute, for example, software stored in the memory 1420 to control one or more hardware components, such as, an image sensor (not shown) of the electronic device 1400 connected to the processor 1410 and may perform various data processing or operations, and control of such components.

The processor 1410 may execute the instructions to perform the operations described above with reference to FIGS. 1 to 13. The processor 1410 may be a hardware-implemented apparatus having a circuit that is physically structured to execute desired operations. The desired operations may include code or instructions included in a program stored in the memory 1420. The hardware-implemented data processing device 1410 may include, for example, a main processor (e.g., a central processing unit (CPU), a field-programmable gate array (FPGA), or an application processor (AP)) or an auxiliary processor (e.g., a GPU, a neural processing unit (NPU), an image signal processor (ISP), a sensor hub processor, or a communication processor (CP)) that is operable independently of, or in conjunction with the main processor. Further details regarding the processor 1410 are provided below.

In some examples, the processor 1410 may output the target images based on the canonical image generative model and the image effect augmentation model through the output device 1440. In some examples, the output device 1440 may provide an output to a user through auditory, visual, or tactile channel. The output device 1440 may include, for example, a speaker, a display, a touchscreen, a vibration generator, and other devices that may provide the user with the output. The output device 1440 is not limited to the example described above, and any other output device, such as, for example, computer speaker and eye glass display (EGD) that are operatively connected to the electronic device 1400 may be used without departing from the spirit and scope of the illustrative examples described. In an example, the output device 1440 is a physical structure that includes one or more hardware components that provide the ability to render a user interface, output information and speech, and/or receive user input.

The processor 1410 may control the electronic device 1400 by executing functions and instructions for execution in the electronic device 1400.

Under the control of the processor 1410, the electronic device 1400 may receive training images, generate first conversion images by converting the received training images into images corresponding to the same scene obtained through another sensor, generate second conversion images obtained by converting the color value of the first conversion images, and train a canonical image generative model for converting the training images, the first conversion images, and the second conversion images into canonical space images of a canonical color space and a canonical illumination space.

Under the control of the processor 1410, the electronic device 1400 may further receive the canonical space images, augment an image effect of the received canonical space images, and train an image effect augmentation model for outputting target images based on the augmented canonical space images.

The processor 1410 may read/write neural network data, for example, image data, feature map data, kernel data, biases, weights, for example, connection weight data, hyper-parameters, and other parameters etc., from/to the memory 1420 and implement the neural network, such as the canonical image generative model and the image effect augmentation model described above, using the read/written data. When the neural network is implemented, the processor 1410 may repeatedly perform operations between an input and parameters, in order to generate data with respect to an output. Here, in an example convolution layer, a number of convolution operations may be determined, depending on various factors, such as, for example, the number of channels of the input or input feature map, the number of channels of the kernel, a size of the input feature map, a size of the kernel, number of the kernels, and precision of values. Such a neural network may be implemented as a complicated architecture, where the processor 1410 performs convolution operations with an operation count of up to hundreds of millions to tens of billions, and the frequency at which the processor 1410 accesses the memory 1420 for the convolution operations rapidly increases.

In some examples, the electronic device 1400 may be installed in or wirelessly connected to a vehicle. Hereinafter, a vehicle refers to any mode of transportation, delivery, or communication such as, for example, for example, an auto-mobile, a truck, a tractor, a scooter, a motorcycle, a cycle, an amphibious vehicle, a snowmobile, a boat, a public transit vehicle, a bus, a monorail, a train, a tram, an autonomous vehicle, an unmanned aerial vehicle, a bicycle, a walking assist device (WAD), a robot, a drone, and a flying object such as an airplane. In some examples, the vehicle may be, for example, an autonomous vehicle, a smart mobility, an electric vehicle, an intelligent vehicle, an electric vehicle (EV), a plug-in hybrid EV (PHEV), a hybrid EV (HEV), or a hybrid vehicle, an intelligent vehicle equipped with an advanced driver assistance system (ADAS) and/or an autonomous driving (AD) system.

In some examples, the autonomous vehicle may be controlled by an onboard computer system that uses algorithms, machine learning, and other artificial intelligence techniques to interpret the sensor data and to make decisions based on that information. The computer system can control the vehicle's speed, direction, acceleration, and braking, as well as other systems such as lighting, heating, and air conditioning. In some examples, the autonomous vehicle may be equipped with communication technologies to interact with other vehicles, infrastructure, and/or a central control system(s). The autonomous vehicle may operate in various modes, such as, for example, fully autonomous, semi-autonomous, and remote control where it is controlled by the central control system(s).

In some examples, the electronic device 1400 may be implemented as, or in, various types of computing devices, such as, a personal computer (PC), a data server, or a portable device. In an example, the portable device may be implemented as a laptop computer, a mobile phone, a smart phone, a tablet PC, a mobile internet device (MID), a personal digital assistant (PDA), an enterprise digital assistant (EDA), a digital still camera, a digital video camera, a portable multimedia player (PMP), a personal navigation device or portable navigation device (PND), or a smart device. In an example, the computing devices may be a wearable device, such as, for example, a smart watch and an apparatus for providing augmented reality (AR) (hereinafter simply referred to as an AR provision device) such as AR glasses, a head mounted display (HMD), various Internet of Things (IOT) devices that are controlled through a network, and other consumer electronics/information technology (CE/IT) devices.

Figure 15:
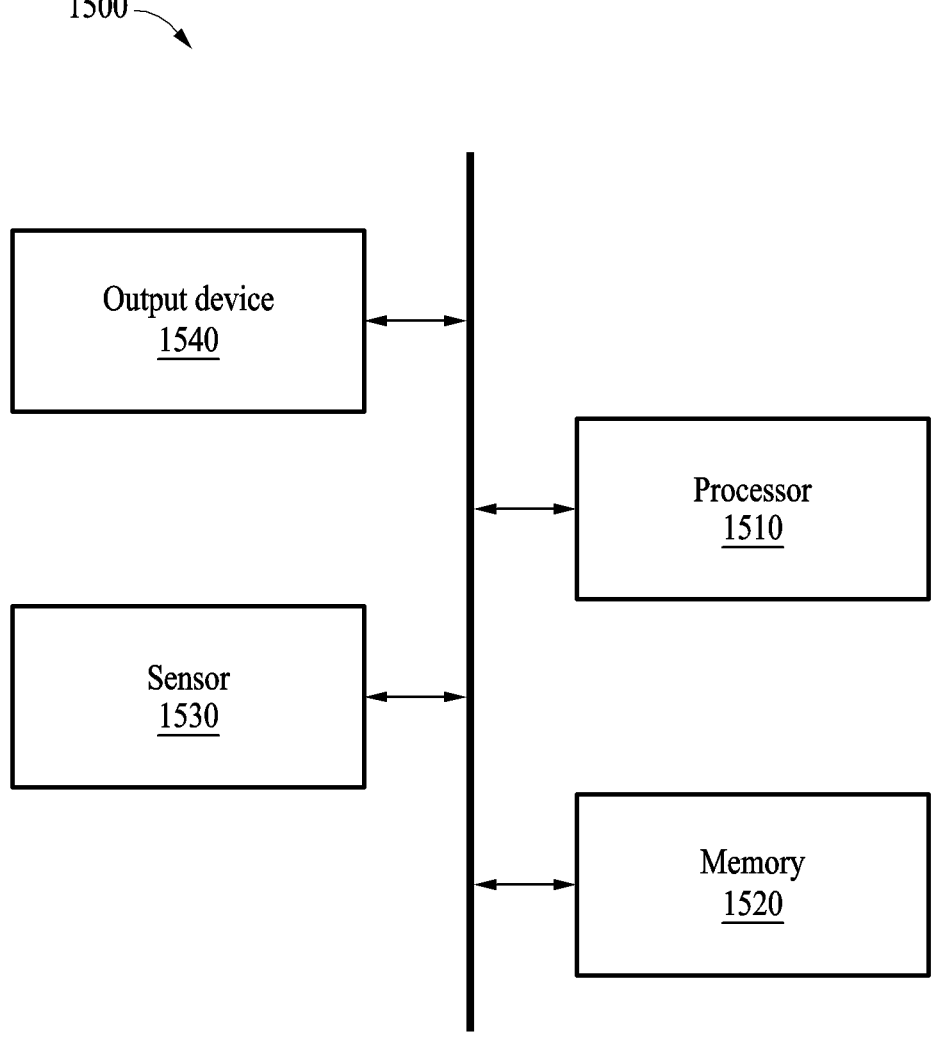
FIG. 15 is a diagram illustrating an example of a configuration of an electronic device for processing an image through a canonical space, according to one or more embodiments.

FIG. 15 is a diagram illustrating an example of a configuration of an electronic device for processing an image through a canonical space.

Referring to FIG. 15, an electronic device 1500 may include an output device 1540, a sensor(s) 1530, a memory 1520, and a processor 1510. The description provided with reference to FIGS. 11 through 13 may also apply to FIG. 15.

The memory 1520 may store computer-readable instructions, and may store a pre-trained ANN model. The description of the processor 1410, the memory 1420, the sensor(s) 1430, and the output device 1440 of FIG. 14 are applicable to the processor 1510, the memory 1520, sensor(s) 1530, and output device 1540 of FIG. 15, respectively, and will not be repeated for brevity.

The processor 1510 may read/write neural network data, for example, image data, feature map data, kernel data, biases, weights, for example, connection weight data, hyperparameters, and other parameters etc., from/to the memory 1520 and implement the neural network, such as the canonical image generative model and the image effect augmentation model described above, using the read/written data. When the neural network is implemented, the processor 1510 may repeatedly perform operations between an input and parameters, in order to generate data with respect to an output. Here, in an example convolution layer, a number of convolution operations may be determined, depending on various factors, such as, for example, the number of channels of the input or input feature map, the number of channels of the kernel, a size of the input feature map, a size of the kernel, number of the kernels, and precision of values. Such a neural network may be implemented as a complicated architecture, where the processor 1510 performs convolution operations with an operation count of up to hundreds of millions to tens of billions, and the frequency at which the processor 1510 accesses the memory 1520 for the convolution operations rapidly increases.

Under the control of the processor 1510, the electronic device 1500 may receive an input image, obtain a canonical image of a canonical color space and a canonical image of a canonical illuminance space by using a canonical image generative model that takes the input image as an input, and obtain a result image, to which image effect augmentation processing is applied, by using an image effect augmentation model that the canonical image as an input. The result image may be an image of an sRGB type, which may be output through the output device 1540.

The computing apparatuses, the electronic devices, the processors, the memories, and other components described herein with respect to FIGS. 1-15 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in the figures that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-Res, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A processor-implemented method of training an image processing model, the method comprising:
   receiving training images of a scene obtained from a first sensor;
   generating first conversion images by converting the training images into images corresponding to the scene obtained through a second sensor;
   generating second conversion images by converting a color value of the training images and a color value of the first conversion images; and
   training a canonical image generative model configured to convert the training images, the first conversion images, and the second conversion images into canonical space images of a canonical color space and a canonical illumination space.

2. The method of claim 1, wherein the generating of the first conversion images comprises generating the first conversion images by maintaining the color value of the training images and converting a pixel value of the training images into a pixel value of the second sensor.

3. The method of claim 1, wherein the generating of the first conversion images comprises generating the first conversion images by maintaining a pixel value of the training images and converting the color value of the training images into a color value of the second sensor.

4. The method of claim 1, wherein the generating of the second conversion images comprises generating the second conversion images by changing a red (R) channel value of the first conversion images and a blue (B) channel value of the first conversion images and applying a uniformly-distributed single illumination to the first conversion images with the changed R channel value and the changed B channel value.

5. The method of claim 1, wherein the canonical image generative model includes a convolutional neural network model.

6. The method of claim 1, wherein the training for converting into the canonical space images comprises training the canonical image generative model to minimize a loss function determined based on a difference between a reference image and each of outputs obtained by inputting the training images, the first conversion images, and the second conversion images to the canonical image generative model.

7. The method of claim 6, wherein the reference image is a standard Red Green Blue (sRGB) image, and the reference image is obtained by the first sensor.

8. The method of claim 6, wherein the loss function applied to the training images, the first conversion images, and the second conversion images is the same.

9. The method of claim 1, wherein the training for converting into the canonical space images further comprises performing training based on a CIE XYZ coordinate value.

10. The method of claim 1, wherein the training for converting into the canonical space images further comprises training the canonical image generative model to minimize a loss function determined based on a difference between the training images and a reference image.

11. The method of claim 1, further comprising:

receiving the canonical space images;

augmenting an image effect of the canonical space images; and training an image effect augmentation model configured to output target images based on the augmented canonical space images.

12. The method of claim 11, wherein the target images are standard Red Green Blue (sRGB) images.

13. The method of claim 11, wherein the target images are:

standard Red Green Blue (sRGB) images of a sensor different from the first sensor;

images with different sensitivity from the training images; or images to which a filter different from a filter of the training images is applied.

14. The method of claim 11, further comprising training the image processing model through a conversion matrix or a convolutional neural network encoder and a convolutional neural network decoder.

15. The method of claim 1, further comprising:

receiving an input image;

inputting the input image into the canonical image generative model to obtain a canonical image of the canonical color space and the canonical illumination space; and obtaining a result image, to which image effect augmentation processing is applied, by using an image effect augmentation model configured to take the canonical image as an input.

16. The method of claim 15, wherein the result image is a standard Red Green Blue (sRGB) image.

17. A non-transitory computer-readable storage medium storing instructions that, when executed by a processor, cause the processor to perform the method of claim 1.

18. An electronic device comprising:

a first sensor configured to capture training images of a scene;

a processor configured to:

receive the training images;

generate first conversion images by converting the training images into images corresponding to the scene obtained through a second sensor;

generate second conversion images by converting a color value of the training images and a color value of the first conversion images; and train a canonical image generative model configured to convert the training images, the first conversion images, and the second conversion images into canonical space images of a canonical color space and a canonical illumination space.

19. The electronic device of claim 18, wherein the processor is further configured to:

receive the canonical space images;

augment an image effect of the canonical space images; and train an image effect augmentation model configured to output target images based on the augmented canonical space images.

20. The electronic device of claim 18, further comprising:

a memory configured to store instructions; and the processor is configured to execute the instructions stored in the memory to configure the processor to:

receive an input image;

input the input image into the canonical image generative model to obtain the canonical image of the canonical color space and the canonical illuminance space; and obtain a result image, to which image effect augmentation processing is applied, by using an image effect augmentation model configured to take the canonical image as an input.

* * * * *